United States Patent [19]
Denber

[11] Patent Number: 6,018,333
[45] Date of Patent: Jan. 25, 2000

[54] METHOD AND APPARATUS FOR SELECTION AND MANIPULATION OF AN OVERLAPPING GRAPHICAL ELEMENT ON A DISPLAY

[75] Inventor: Michel J. Denber, Rochester, N.Y.

[73] Assignee: Xerox Corporation, Stamford, Conn.

[21] Appl. No.: 08/360,478

[22] Filed: Dec. 21, 1994

[51] Int. Cl.[7] .................................................. G09G 5/08
[52] U.S. Cl. ............................................ 345/145; 345/343
[58] Field of Search ..................................... 345/112, 119, 345/120, 113, 118, 145, 340, 343, 344, 345; 395/155, 157, 159, 156, 119, 118

[56] References Cited

U.S. PATENT DOCUMENTS

| 5,315,313 | 5/1994 | Shinagawa | 345/145 |
| 5,363,482 | 11/1994 | Victor et al. | 395/159 |

FOREIGN PATENT DOCUMENTS 0027278  11/1994  WIPO .................................... 345/119

OTHER PUBLICATIONS

Robert Cowart, Mastering Window, pp. 64–68; 1993
"Diagram Understanding: Associating Symbolic Descriptions with Images,"IEEE Computer Society Workshop on Visual Languages, (1986), pp. 4–11.
"Formalizing the Figural: Aspects of a Foundation for Document Manipulation," Xerox Palo Alto Research Center, 1980–1990, vol., No., (1993), pp. 132–38.
"Eight–Sided Bounding Boxes," Xerox Disclosure Journal, vol. 19, No. 1, (Jan./Feb. 1994), pp. 75–76.

*Primary Examiner*—Chanh Nguyen
*Attorney, Agent, or Firm*—Aditya Krishnan; Mark Costello

[57] ABSTRACT

The present invention is a method and apparatus for simplifying the selection and manipulation of one or more graphical elements which overlap at at least one common point or region on a display, displaying the graphical elements in a separated manner while showing the relationship between such elements, and improving the ability to select one of a plurality of overlapping elements depicted on the display of a data processing system. The present invention finds particular use with well-known drawing and illustration software suitable for use on data processing systems.

16 Claims, 4 Drawing Sheets

METHOD AND APPARATUS FOR SELECTION AND MANIPULATION OF AN OVERLAPPING GRAPHICAL ELEMENT ON A DISPLAY

CROSS REFERENCE

The following related applications are hereby incorporated by reference for their teachings:

"Coupling a Display Object to a Viewpoint in a Navigable Workspace," Robertson, application Ser. No. 08/227,763, filed Apr. 14, 1994.; and "Apparatus and Method for Supporting the Implicit Structure of Freeform Lists, Outlines, Text, Tables, and Diagrams in a Gesture-based Input System and Editing System," Moran et al., application Ser. No. 08/176,150, filed Dec. 30, 1993.

This invention relates generally to a method and apparatus for selection and manipulation of one of a plurality of overlapping graphical elements displayed on a display, and more particularly to a method and apparatus for depicting coinciding or overlapping elements in a three-dimensional manner so as to facilitate the selection thereof upon recognizing that such elements coincide or overlap in a region designated by a pointing device.

BACKGROUND AND SUMMARY OF THE INVENTION

The present invention is directed to improving the user interface in a data processing system employed for the generation of drawings or illustrations on a display screen. When a pointing device, such as a mouse, is used to indicate the position in the workspace of the display screen, a conventional selection mechanism designates or selects the graphical object closest to the indicated point, the cursor position at the time of selection. However, in conventional systems, the user's indication of a selection in a region of the workspace where multiple graphical objects coincide or overlap may easily result in the selection of an object not desired.

Heretofore, a number of patents and publications have disclosed techniques and devices suitable for editing and manipulating documents, the relevant portions of which may be briefly summarized as follows:

U.S. Pat. No. 5,315,313 to Shinagawa, issued May 24, 1994, discloses a figure electing device that permits a user to select a figure in the vicinity of a point indicated on a display screen. Fuzzy inference based upon fuzzy rules are employed to determine the figure designated by the pointing device.

In "Diagram Understanding: Associating Symbolic Descriptions with Images," *IEEE Computer Society Workshop on Visual Languages*, (1986), pp. 4–11, Montalvo teaches a paradigm for the discovery and validation of higher-level visual properties. The author recognizes the needs of users to select objects and properties by pointing and to input objects by drawing, and particularly, the endless possibilities of selecting one element from a set.

In "Formalizing the Figural: Aspects of a Foundation for Document Manipulation," *Xerox Palo Alto Research Center,* 1980–1990, Vol., No., (1993), pp. 132–38, Levy et al. describe a model to account for the graphical appearance of figures and windows with a graphical user interface. More specifically, the authors illustrate that an image configuration or display may be represented as a set of figures "floating" in 2½ dimensional space, which by a process called rendering are flattened to produce a 2-dimensional visual field for display.

In "Eight-Sided Bounding Boxes," Xerox Disclosure Journal, Vol. 19, No. 1, (January/February 1994), pp. 75–76, Harrington teaches a method for determining which objects within a scene overlap.

In accordance with the present invention, there is provided a method for selecting an element, using a pointing device, from among a plurality of overlapping elements displayed in an image display plane of a data processing system, wherein the pointing device establishes a selection point in the image display plane and provides location information for the selection point, including the steps of:

determining coordinates of the selection point;

identifying, based upon the coordinates, all elements having at least one point in common with the selection point;

recognizing when plural elements have a point in common with the selection point;

upon recognition of plural elements in common with the selection point, displaying, at a separate location of the image display, representations of the identified plural elements in a form suitable for enabling the selection thereof; and enabling the selection of one of the representations of the plural elements displayed at the separate location, wherein the selection of the representation also selects the associated one of the plural elements.

In accordance with another aspect of the present invention, there is provided an apparatus for selecting a graphical element, using a pointing device, from among a plurality of overlapping graphical elements displayed in an image display plane in a data processing system, wherein the pointing device establishes a selection point in the image display plane and provides location information for the selection point, including:

a pointer interface for generating a pair of coordinates for the selection point;

element identifying means, responsive to said pointer interface, for receiving the coordinate pair and, based upon the coordinates, identifying all graphical elements having at least one point in common with the selection point;

control circuitry for determining when a plurality of identified graphical elements have a point in common with the selection point;

a display window, for displaying at a separate location on the image display, representations of the identified plural graphical elements in a form suitable for enabling the selection thereof; and selection means, responsive to said coordinate determining means, for recognizing the selection of one of the representations of the plural graphical elements displayed at the separate location, wherein the selection of the representation also selects the associated one of the plural graphical elements.

One aspect of the invention is based on the observation of problems with conventional image editing systems. This aspect is based on the discovery of a technique that alleviates these problems by providing a second, improved visual representation of the overlapping graphical elements within a workspace and allowing the selection and manipulation of the respective overlap position (layer) of one or more of said elements by "selection" of the improved representation of the element(s).

The present invention will be described in connection with a preferred embodiment, however, it will be understood that there is no intent to limit the invention to the embodiment described. On the contrary, the intent is to cover all alternatives, modifications, and equivalents as may be included within the spirit and scope of the invention as defined by the appended claims.

DESCRIPTION OF THE PREFERRED EMBODIMENT

For a general understanding of the present invention, reference is made to the drawings. In the drawings, like reference numerals have been used throughout to designate identical elements. In describing the present invention, the following term(s) have been used in the description.

"Circuitry" or a "circuit" is any physical arrangement of matter that can respond to a first signal at one location or time by providing a second signal at another location or time. Circuitry "stores" a first signal when it receives the first signal at one time and, in response, provides substantially the same signal at another time. Circuitry "transfers" a first signal when it receives the first signal at a first location and, in response, provides substantially the same signal at a second location.

The term "data" refers herein to physical signals that indicate or include information. A "data storage medium" or "storage medium" is a physical medium that can store data, for example, a floppy disk is a storage medium. A "storage medium access device" is a device that includes circuitry that can access data on a data storage medium. Examples include drives for reading magnetic and optical data storage media.

"Memory circuitry" or "memory" is any circuitry that can store data, and may include local and remote memory and input/output devices. Examples include semiconductor ROMs, RAMs, and storage medium access devices with data storage media that they can access.

A "data processing system" is a physical system that processes data. A "data processor" or "processor" is any component or system that can process data, and may include one or more central processing units (CPUs) or other processing components. A processor performs an operation or a function "automatically" when it performs the operation or function independent of human control. A "processing unit" is a processor that is a component within another processor.

A signal "indicates" or "selects" one of a set of alternatives if the signal causes the indicated one of the set of alternatives to occur. For example, a signal can indicate one bit set in a sequence of bit sets to be used in an operation, in which case the signal causes the indicated bit set to be used in the operation.

A "logic operation" is an operation that obtains one bit using each bit of an operand independent of values of other bits of the operand. NOT is an example of a logic operation that uses one operand. OR, AND, and XOR are examples that use two operands. An "instruction" is an item of data that a processor can use to determine its own operation. A processor "executes" a set of instructions when it uses the instructions to determine its operations.

"Bus circuitry" or a "bus" is circuitry connecting two or more components, at least one of which is a "source" and at least one of which is a "destination," such that the bus circuitry is capable of transferring a signal provided by any of the sources to all of the destinations. Some devices connected to bus circuitry can act both as sources and destinations. A bus receives, transfers, or provides an item of data that includes more than one bit "in horizontal format" if the bits of the item are received, transferred, or provided at approximately the same time.

"Control circuitry" is circuitry that provides data or other signals that determine how other components operate. For example, "instruction circuitry" is control circuitry that provides items of data indicating instructions to a component that includes processing circuitry. A CPU may include control circuitry for the control of various circuits and components of a data processing system.

"User input circuitry" is circuitry for providing signals based on actions of a user. User input circuitry can receive signals from one or more "user input devices," such as a keyboard or a mouse, that provide signals based on actions of a user. The set of signals provided by user input circuitry can therefore include data indicating mouse or pointer operation and data indicating keyboard operation. Signals from user input circuitry may include a "request" for an operation, in which case a system may perform the requested operation in response.

An "image" is a pattern of light. A "display" is an image output device that provides information in a visible form. A display may, for example, include a cathode ray tube; an array of light emitting, reflecting, or absorbing elements; a structure that presents marks on paper or another medium; or any other structure capable of defining an image in a visible form. To "present an image" on a display is to operate the display so that a viewer can perceive the image.

Data "defines" an image when the data includes sufficient information to produce the image, such as by presenting it on a display. A wide variety of display techniques for data processing systems are available including, for example, various graphical user interfaces, but, despite their diversity, these techniques tend to have certain common characteristics.

A "display element" or "element" is a display feature that is perceptible as a coherent unity. A "shape" is a display element that has a distinguishable outline; for example, a circular display element is a shape. An "object" or "graphical object" is comprised of one or more display elements. An image "includes" an element or object if presentation of the image can produce a visual perception of the element or object.

A "workspace" is perceived when objects, formed from one or more elements, or other display features in an image are perceived as having positions in a space. A "three-dimensional workspace" is a workspace that is perceived as extending in three orthogonal dimensions. Typically, a display has a two-dimensional (planar) display surface and the perception of a third dimension is produced by visual clues such as perspective lines extending toward a vanishing point; obscuring of distant objects by near objects; size changes in objects moving toward or away from the viewer;

perspective shaping of objects; different shading of objects at different distances from the viewer, and so forth. Three-dimensional workspaces include not only workspaces in which all of these cues combine to produce the perception of three dimensions, but also workspaces in which a single cue can produce the perception of three dimensions. For example, a workspace with overlapping display objects or a workspace within which a view can zoom in on an object can be a three-dimensional workspace even though objects within it are presented in orthographic projection, without perspective.

A signal from a user input device "indicates" or "selects" a point or region if the signal includes data from which the point or region can be identified. For example, if a signal includes data indicating a mouse pointer displacement, a system can find a point in the display plane based on the previous pointer position. This point can then be used to project a ray from the viewpoint into the three-dimensional workspace being presented orthographically, and the coordinates of display elements can be used to find the nearest display elements intersected by the ray. The point or a set of points at the intersection can thus be identified as the region selected.

A common characteristic of display systems is a mapping between items of data within the system data structure and display elements presented by the system. A structure "represents" a body of data when display elements of the structure map one-to-one with the items of data in the body of data. A display element "represents" the item of data to which it maps.

A "selectable unit" is a display element that can be selected. The term "select," when used in relation to a selectable unit, means a user input operation that includes a signal that indicates the selectable unit. In general, an action by a user "indicates" an element, an event, or a characteristic when the action demonstrates or points out the element in a manner that is distinguishable from actions that do not indicate the element. The user can, for example, use a pointing device such as a mouse to select a selectable unit by indicating its position and clicking a button on the pointing device.

Figure 1:
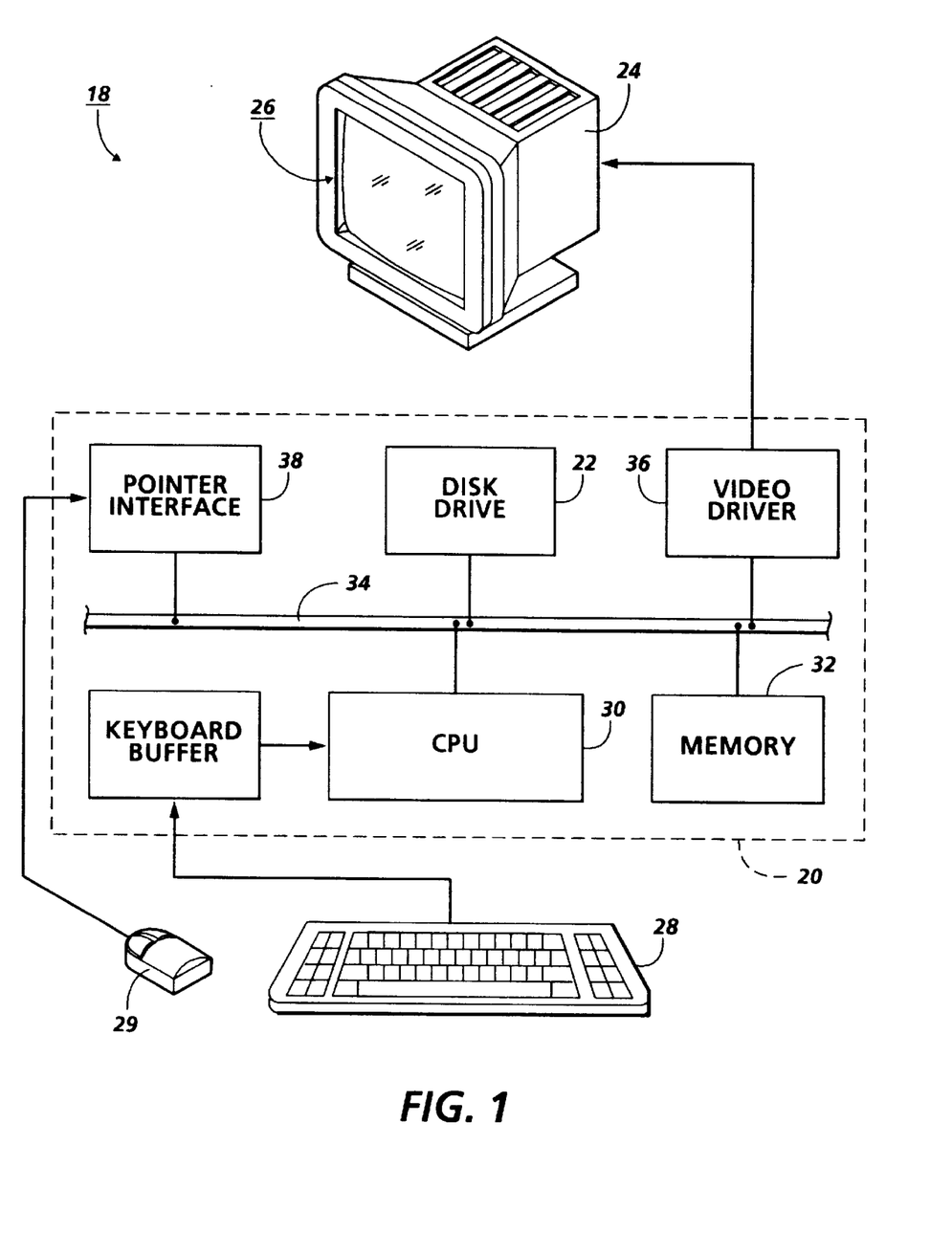
FIG. 1 is a representation of the principal components of a data processing system in which the present invention finds particular use.

FIG. 1 illustrates a data processing system in which the present invention finds practical use. Data processing system 18 includes a processing unit 20 which preferably houses one or more data storage storage devices or drives 22 (rigid and/or floppy) and other devices as previously described. Data processing system 18 may be any commonly available personal or business computing system. For example, a system employing an Intel 486DX2 CPU (30) or similar processor suitable for executing arithmetic and logic operations, 2 megabytes of RAM (32), internal bus 34, and being capable of executing software code for commonly available drawing and illustration packages would be sufficient to practice the present invention.

Processing unit 20 is connected to a display 24 having a screen surface 26 for the display for two-dimensional (generally planar) images thereon. Display 24 may be any well-known video monitor capable of presenting images generated by the drawing or illustration software executed by CPU 30. Driving display 24 in response to signals placed on bus 34 by CPU 30 is a video driver 36 or similar video circuitry capable of interfacing between processing unit 20 and display 24, for example, a Super Video Graphics Adapter (SVGA) or commonly available graphics accelerator. Also connected to the processing unit are user input circuitry or devices such as keyboard 28 and mouse 29.

Mouse 29 may be any well-known pointing device, including pen-type devices, ball-type input devices or touch-sensitive displays, wherein pointer interface circuitry 38 is capable of transforming signals generated by pointing device 29 into signals that maybe interpreted and/or stored in memory by CPU 30.

The signals from user input circuitry or pointer interface 38 are generally used to monitor user input via the pointing device and in turn to move a cursor on screen 26 of display 24. Such devices are also capable of signaling non-directional input (i.e., a mouse button click) so as to affirmatively indicate an operation at an indicated point on screen 26. It is further noted that keyboard 28 may be employed, using arrow or similarly identified keys thereon, to provide user input suitable for moving a cursor displayed on screen 26.

Figure 2:
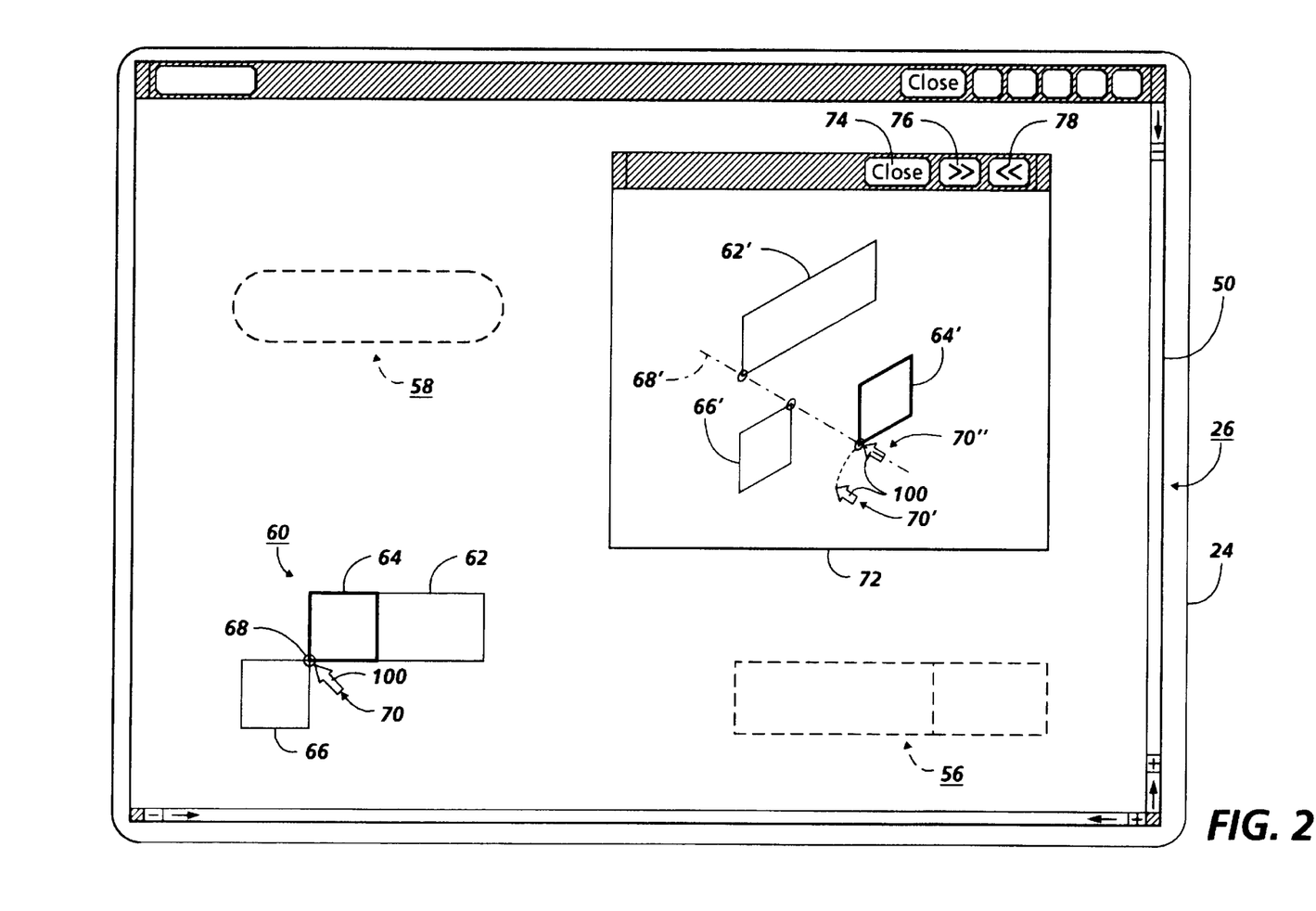
FIG. 2 is a detailed example of the image displayed on the monitor of FIG. 1.

Referring to FIG. 2, there is illustrated a display screen 26 having numerous graphical objects displayed thereon, referenced generally by numerals 56, 58 and 60, that together with the bordering window 50 form an image of a two-dimensional workspace. One of the groups of objects displayed within window 50 is object 60 which is comprised of a plurality of box-like elements 62, 64, and 66. The locations and further details of the objects and elements displayed on screen 26 are preferably stored in a data structure in memory 32 of FIG. 1 and are suitable for enabling the generation of the image displayed. The data structure, as is well-known, is updated any time objects are added, edited, moved, etc., so as to depict the result of such user-initiated operations on the screen. In FIG. 2, elements 62, 64, and 66 further appear, in the two-dimensional display plane, to overlap or intersect at at least a single point 68, and it is particularly difficult to distinguish the boundaries of boxes 62 and 64. Thus, as is commonly experienced with many drawing and illustration software packages available, moving the cursor 100 to the position indicated by reference numeral 70, and depressing a button on the pointing device (e.g., mouse), or similarly indicating a selection, will result in the selection and highlighting of one of the elements 62, 64 or 66, or perhaps the selection of all the elements. As previously described, the inability to readily select one element from a set of overlapping elements that may or may not form a graphical object usually results in considerable frustration for the user.

Figure 3:
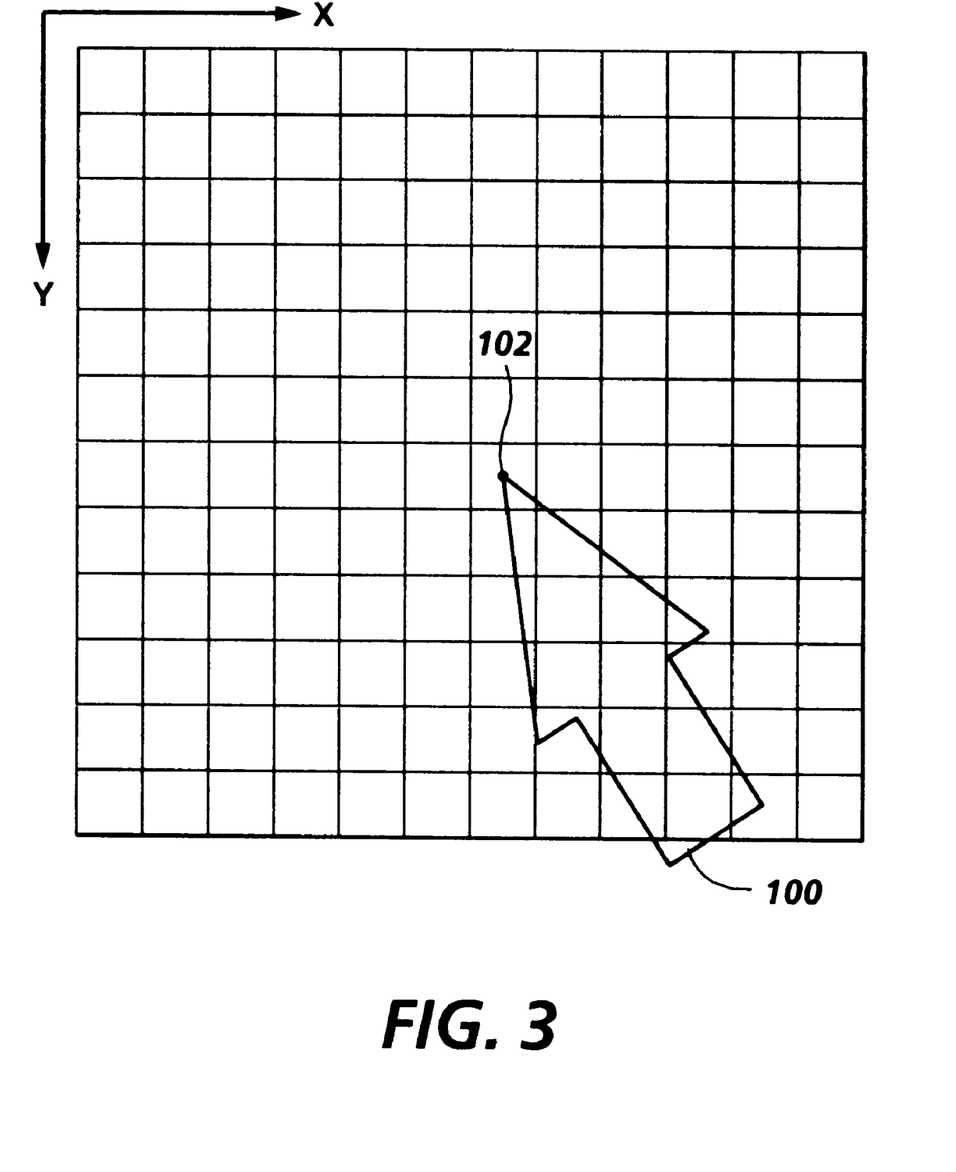
FIG. 3 is a representation of a pointing device driven cursor as used in the present invention.

As illustrated in FIG. 3, the cursor displayed on screen 26 is a visual aid to the user of the data processing system to assist in the selection of one or more display elements forming objects displayed on the screen. Typically, the CPU monitors the input of the pointing device so as cause the video driver to present an image of the cursor 100 as moving to one of the unique coordinate positions (x,y) (commonly displayed as pixels) indicated by the grid of FIG. 3. It is further noted that while a Cartesian coordinate system is preferred, alternative coordinate systems may be employed. In response to movement of the pointing device, the user input circuitry detects the movement, generates signals indicative thereof, and the CPU moves the displayed cursor to a point in the workspace. Selection of a graphical element, as generally described above, occurs when the user moves the pointing device or, alternatively, depresses keys on the keyboard. Upon indicating a selection, the user input circuitry detects the indication, generates signals indicative thereof, and the CPU indicates the selection in a well-known manner, for example, by highlighting the element or object selected.

Figure 4:
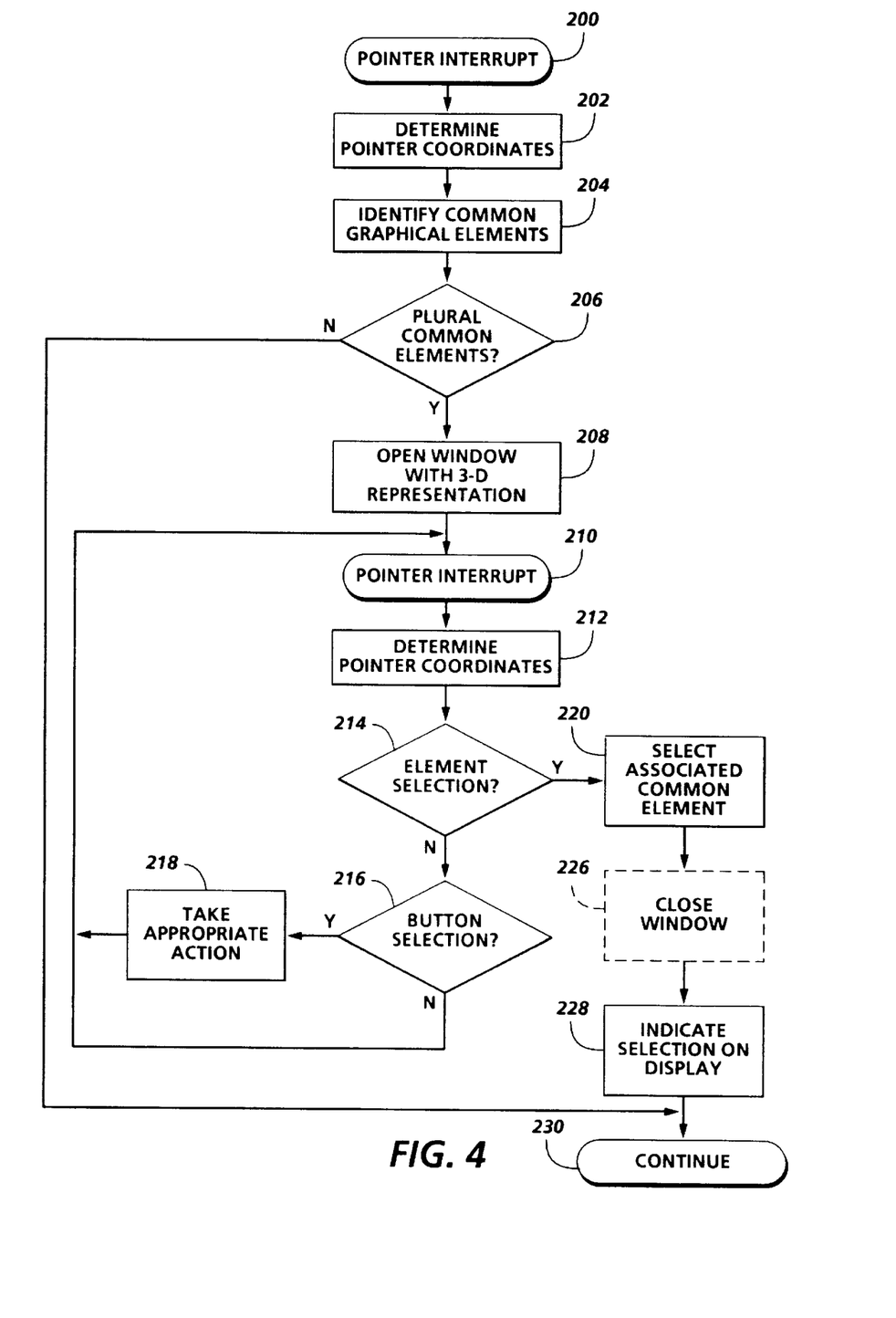
FIG. 4 is a flowchart depicting the various steps associated with the accomplishment of the present invention when executed by the data processing system of FIG. 1.

Referring also to the flowchart of FIG. 4, this action is often an interrupt driven process that occurs within CPU 30 as a result of a signal generated by the user input circuitry, and may be used to initiate the operation of the present invention, step 200. Referred to hereafter as indicating point 102, the coordinates of the location of cursor 100 when the user made a selection are then stored by the CPU in registers or similar memory locations, step 202. The pointer interface 38 of FIG. 1 and the associated registers or memory locations used for storage of the x and y cursor coordinates, and equivalents thereof, are hereafter referred to as coordinate determining means. Subsequently, at step 204 the data structure used to store the location and attributes of the objects and elements displayed on screen 26 is interrogated by an element identifying operation executed by the CPU. Specifically, in one embodiment of the present invention, the operation would detect elements or graphical objects sharing a point in common with the indicating point (indicated by reference numeral 68 in FIG. 2). Similarly, the present invention is intended to further include detection when the user selection is in a region of partial object overlap (where portions of the graphical objects remain individually accessible) or obscuration (where a larger graphical object completely obscures a smaller object so as not to be selectable by the user).

After elements having regions thereof in common with the indicating point are identified, the CPU would further execute the test of step 206 so as to execute logic operations and determine if more than one display element was represented in the displayed workspace at the indicating point. If no elements, or only one element are present, processing would continue at step 230. Alternatively, if two or more graphical objects or elements thereof are determined to be present at the indicating point, processing continues at step 208, where display window 70 of FIG. 2 is opened. More specifically, display window 72 is a three-dimensional workspace that preferably depicts the graphical objects or elements in window 50 that share a common point with the indicating point as representations of the objects and elements depicted in three-dimensional form. As can be seen in FIG. 2, window 72 contains a single dashed line representing the extension of the indicating point in a z-direction, out of the surface of window 50, with each of the three box-like graphical objects, 62', 64' and 66', displayed in a perspective representation. Moreover, the cursor 100 is now depicted within the workspace of window 72, where it may be optionally constrained until a selection is made, having been automatically repositioned there by operation of the data processing system. Alternatively, the cursor may be moved to a position within window 72 by the user's movement of the pointing-device.

In a preferred embodiment, the commonly located graphical elements would be displayed in a layered manner, wherein the relative positions of the elements may be represented. For example, it is well-known to be able to specify when a selected item is to be placed on the top or bottom of other elements which it overlaps. Moreover, this relationship is understood to be represented within the data structure used to define the image displayed in the two-dimensional workspace. Hence, the relative positioning of the graphical elements in the three-dimensional workspace may be determined in a similar fashion.

Returning to the flowchart of FIG. 4, once the three-dimensional workspace window 72 is opened on display 26, the CPU then awaits further user input from the pointer interface, steps 210 and 212, indicating a selection by the user as a result of clicking a mouse or pointing device button within window 70. Step 214 tests for a selection of one of the graphical objects or elements displayed within window 70, as would be indicated, for example, by moving the cursor 100 to the position indicated by reference numeral 70" and clicking the mouse. Such an action by the user of the data processing system would result in the selection of the common box-like element 64', causing the element to be highlighted as indicated in FIG. 2 by the bold border and as represented in FIG. 4 as step 220. In particular, moving cursor 100 to a boundary, interior, or control point associated with objects 62', 64' or 66' and "clicking" the pointing device would result in selection of the object. Also, indicating a selection along any point of dashed line 68' could indicate the user's intent to select all elements sharing the common indicating point 68. In addition, objects 62', 64' or 66' could, as displayed in window 72, contain additional control points for selection of various elements thereof. For example, the four lines defining object 66' in window 72 may further include and possibly display (not shown) control points enabling the selection of one side of the box-like object (a single line element) independently of the remaining sides.

Subsequently, the window might automatically be closed, step 226, and the two-dimensional display of window 50 updated to indicate selection of graphical element 64, step 228. As an alternative, the user may be able to select multiple graphical elements depicted within the workspace of window 70, wherein upon closing the window the selected elements would also remain "selected" within the workspace of window 50.

In addition, as illustrated in window 70 of FIG. 2, and by steps 216 and 218 of FIG. 4, the user may choose not to make a selection, and instead: close the window, button icon 74; magnify the elements within the window, button icon 76; or reduce the elements within the window, button icon 78. Any one of the button selections detected at step 214 would be executed as appropriate by the CPU at step 218, and in accordance with known display techniques. Although not specifically illustrated in FIG. 4, selection of the close window button icon, 74, will result in a continuation of the system operation as represented by step 230. On the other hand, selection of either button icon 76 or 78 will result in a predefined change in the magnification, or size, of the elements displayed within window 70 in accordance with well-known display techniques.

Once any one of the above selections is made by the user via the pointing device, and acted upon by the CPU, the system would continue processing in a normal fashion at step 230. It is further understood that for reasons of improved user responsiveness, window 70 may be opened by the user at any time to display the relative relationships between graphical elements. Furthermore, window 70 may remain open once it is opened in accordance with any of the previously described operations. In such situations, the elements displayed within the window may vary in accordance with the position of the cursor within the two-dimensional workspace of window 50, or the elements displayed may be selectable by rubber-banding or chording a region of the window 50 workspace. Thus, it is also possible to employ the three-dimensional display window paradigm of FIG. 2 in a user requested manner, in addition to the automatic operation described above with respect to graphical object selection ambiguity. Such an embodiment may be utilized to manipulate objects that do not overlap, so as to bring them into an overlapping relationship or to alter and overlapping relationship therebetween. In other words, to easily change the layer at which an object is to be displayed in the two-dimensional window 50. For example, referring to FIG. 2, the alternative embodiment would enable the selection of an object such as 66', and the subsequent movement thereof in a direction parallel to line 68' so as to change the relative overlap position with respect to objects 62' or 64'. Such an embodiment will replace the "move to front" or "place above" commands employed in well-known graphic and illustration software systems in which the present invention finds particular use.

In recapitulation, the present invention is a method and apparatus for recognizing when a user is attempting to select one or more graphical elements that overlap at one or more common points or regions on a display, displaying the graphical elements in a separated fashion while showing the relationship between such elements, and improving the ability to select one or more of the plurality of overlapping elements represented on the display of a data processing system. The present invention finds particular use with well-known drawing and illustration software suitable for use on data processing systems.

It is, therefore, apparent that there has been provided, in accordance with the present invention, a method and apparatus for improving the ability of a user to select one of a plurality of overlapping graphical objects or elements represented on the display of a data processing system. While this invention has been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of the appended claims.

I claim:

1. A method of operating a data processing system to select an element, using a pointing device, from among a plurality of overlapping elements displayed in an image display plane of the data processing system, wherein the image display plane includes a first window in which the plurality of overlapping elements are displayed and where the pointing device establishes a selection point in the image display plane and provides location information for the selection point, including the steps of:

determining coordinates of the selection point;

identifying, based upon the coordinates, all elements having at least one point in common with the selection point;

automatically recognizing when plural elements have a point in common with the selection point;

upon automatically recognizing plural elements in common with the selection point, opening a second window in the image display plane and displaying in a second window, at a separate location of the image display plane, representations of the identified plural elements recognized, in a spaced-apart fashion suitable for the selection of one of the representations; and selecting one of the representations of the plural elements displayed at the separate location, wherein the selection of the representation also selects the associated one of the plural elements.

2. The method of claim 1 further comprising the step of automatically closing the second window upon the selection of at least one of the representations of the plural elements.

3. The method of claim 1 wherein the step of displaying representations of the identified plural elements in a spaced apart fashion comprises the steps of:

determining a relationship between the identified plural elements; and spacing the representations of the elements within the second window in a manner indicative of the relationship.

4. The method of claim 3 wherein the relationship is indicative of a relative layer that the elements occupy in a three-dimensional image space.

5. The method of claim 4 wherein the step of spacing the representations of the elements within the second window comprises the step of showing the representations in a three-dimensional fashion within the second window, whereby the relative positioning of the representations of the elements is indicative of the relative relationships between the elements.

6. The method of claim 5 wherein the relative relationships between the elements are stored in a data structure in memory, the data structure being suitable for enabling the generation of both the two-dimensional image displayed in the first window, and the the three-dimensional image displayed in the second window.

7. The method of claim 6 further comprising the steps of:

moving the selected one of the representations of the elements displayed at the second window relative to another of the representations displayed therein so as to alter the overlapping relationship therebetween; and updating the display of the overlapping graphical elements in both the first window and the second window so as to depict the altered overlapping relationship.

8. The method of claim 7 further comprising the step of updated the data structure at any time the representations of the plural elements displayed at the second window are moved relative to another.

9. The method of claim 1 further comprising the step of altering the magnification of the second window so as to change the size of the representations displayed therein.

10. The method of claim 1 further comprising the steps of:

moving the selected one of the representations of the plural elements displayed at the separate location relative to another of the representations so as to alter the overlapping relationship therebetween; and updating the display of the overlapping graphical elements in the image display plane so as to depict the altered overlapping relationship.

11. The method of claim 1, wherein the point in common with the selection point is a control point for the plural elements.

12. An apparatus for selecting a graphical element, using a pointing device, from among a plurality of overlapping graphical elements displayed on an image display in a data processing system, wherein the pointing device establishes a selection point in the image display plane and provides location information for the selection point, including:

a pointer interface for generating a pair of coordinates for the selection point;

element identifying means, responsive to said pointer interface, for receiving the coordinate pair and, based upon the coordinates, identifying all graphical elements having at least one point in common with the selection point;

control circuitry for automatically determining when a plurality of identified graphical elements have a point in common with the selection point;

a display window, for displaying at a separate location on the image display, representations of the identified plural graphical elements in a spaced-apart fashion for selection thereof; and selection means, responsive to said coordinate determining means, for recognizing the selection of one of the representations of the plural graphical elements displayed at the separate location, wherein the selection of the representation also selects the associated one of the plural graphical elements.

13. The apparatus of claim 12 wherein said display window for displaying representations of the identified plural graphical elements comprises a two-dimensional window containing a three-dimensional representation of the graphical elements therein.

14. The apparatus of claim 13 wherein the relative positions of the graphical elements in the three-dimensional representation is indicative of the relative relationships between the overlapping graphical elements.

15. The apparatus of claim 12, further including:

means, responsive to the coordinates generated by the pointer interface in response to movement of the pointing device, for moving a selected one of the representations of the plural graphical elements relative to another of the graphical element representations so as to alter the overlapping relationship therebetween; and a video driver for refreshing the display of the overlapping graphical elements in the image display plane so as to depict the altered overlapping relationship.

16. The apparatus of claim 12, wherein the point in common with the selection point is a control point for the plurality of graphical elements.

* * * * *